United States Patent
Lee et al.

(10) Patent No.: US 7,281,894 B2
(45) Date of Patent: Oct. 16, 2007

(54) TURBINE AIRFOIL CURVED SQUEALER TIP WITH TIP SHELF

(75) Inventors: Ching-Pang Lee, Cincinnati, OH (US); Chander Prakash, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 11/162,434

(22) Filed: Sep. 9, 2005

(65) Prior Publication Data

US 2007/0059173 A1   Mar. 15, 2007

(51) Int. Cl.
F01D 5/20 (2006.01)

(52) U.S. Cl. .................. 416/92; 416/228; 415/173.1

(58) Field of Classification Search ............... 416/237, 416/223 A, 228, 92; 415/173.1
See application file for complete search history.

(56) References Cited

U.S. PATENT DOCUMENTS

| | | |
|---|---|---|
| 5,282,721 A | 2/1994 | Kildea |
| 6,672,829 B1 * | 1/2004 | Cherry et al. ............. 416/97 R |
| 6,790,005 B2 * | 9/2004 | Lee et al. ................ 416/97 R |

* cited by examiner

Primary Examiner—Richard A. Edgar
(74) Attorney, Agent, or Firm—Adams Evans P.A.; David L. Narciso

(57) ABSTRACT

An airfoil for a gas turbine engine includes a root, a tip, a leading edge, a trailing edge, and opposed pressure and suction sidewalls extending generally along a radial axis. The airfoil includes a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the airfoil. At least a portion of the pressure-side tip wall is recessed from the pressure sidewall to define an outwardly facing tip shelf, such that the pressure-side tip wall and the tip shelf define a trough therebetween.

20 Claims, 7 Drawing Sheets

TURBINE AIRFOIL CURVED SQUEALER TIP WITH TIP SHELF

BACKGROUND OF THE INVENTION

This invention relates generally to gas turbine engine airfoils, and more particularly to turbine airfoils having reduced tip leakage.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In the turbine, an array of airfoil-shaped turbine blades extend radially outwardly from a supporting rotor disk.

The airfoils have opposed pressure and suction sides extending axially between corresponding leading and trailing edges and radially between a root and a tip. The blade tip is spaced closely to a surrounding turbine shroud. The gas pressure difference between the pressure side tip and the suction side tip causes the gas to leak from the pressure side tip through the tip clearance or gap with the shroud, and toward the suction side tip. This tip leakage flow can not produce useful turbine work and will result in performance loss. Thus, maximum efficiency of the engine is obtained by minimizing the tip clearance. However, the degree to which the gap can be reduce is limited by the need to allow for differential thermal and mechanical expansion and contraction between the rotor blades and the turbine shroud to prevent undesirable tip rubs.

Accordingly, prior art turbine blade designs include various features to reduce leakage and/or improve film cooling effectiveness, such as "tip shelves" and angled squealer tips.

Nevertheless, there remains a need for a turbine blade tip which reduces the overall tip leakage flow and thereby increases the efficiency of the turbine.

BRIEF SUMMARY OF THE INVENTION

The above-mentioned need is met by the present invention, which according to one aspect provides an airfoil for a gas turbine engine including a root, a tip, a leading edge, a trailing edge, and opposed pressure and suction sidewalls extending generally along a radial axis. The airfoil includes a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the airfoil. At least a portion of the pressure-side tip wall is recessed from the pressure sidewall to define an outwardly facing tip shelf, such that the pressure-side tip wall and the tip shelf define a trough therebetween.

According to another aspect of the invention, a turbine blade for a gas turbine engine includes a dovetail adapted to be received in a disk rotatable about a longitudinal axis; a laterally-extending platform disposed radially outwardly from the dovetail; and an airfoil including a root, a tip, a leading edge, a trailing edge, and opposed pressure and suction sidewalls extending generally along a radial axis. The airfoil includes: a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the blade. At least a portion of the pressure-side tip wall is recessed from the pressure sidewall to define an outwardly facing tip shelf, such that the pressure-side tip wall and the tip shelf define a trough therebetween.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
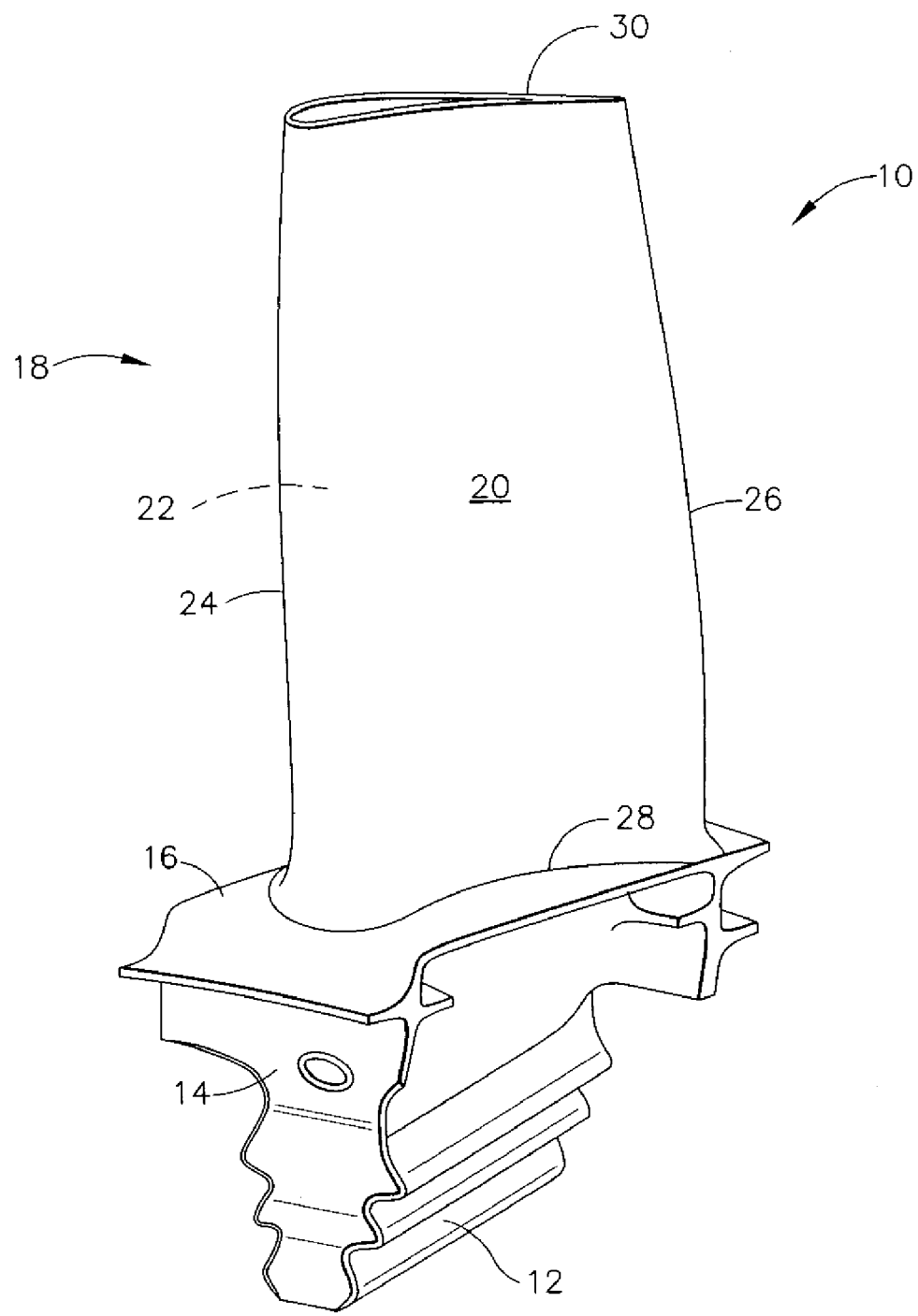
FIG. 1 is a perspective view of an exemplary turbine blade constructed according to the present invention.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to a disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil 18 has a concave pressure sidewall 20 and a convex suction sidewall 22 joined together at a leading edge 24 and at a trailing edge 26. The airfoil 18 extends from a root 28 to a tip 30, and may take any configuration suitable for extracting energy from the hot gas stream and causing rotation of the rotor disk. The blade 10 may be formed as a one-piece casting of a suitable superalloy, such as a nickel-based superalloy, which has acceptable strength at the elevated temperatures of operation in a gas turbine engine. At least a portion of the airfoil 18 is typically coated with a protective coating such as an environmentally resistant coating, or a thermal barrier coating, or both.

Figure 2:
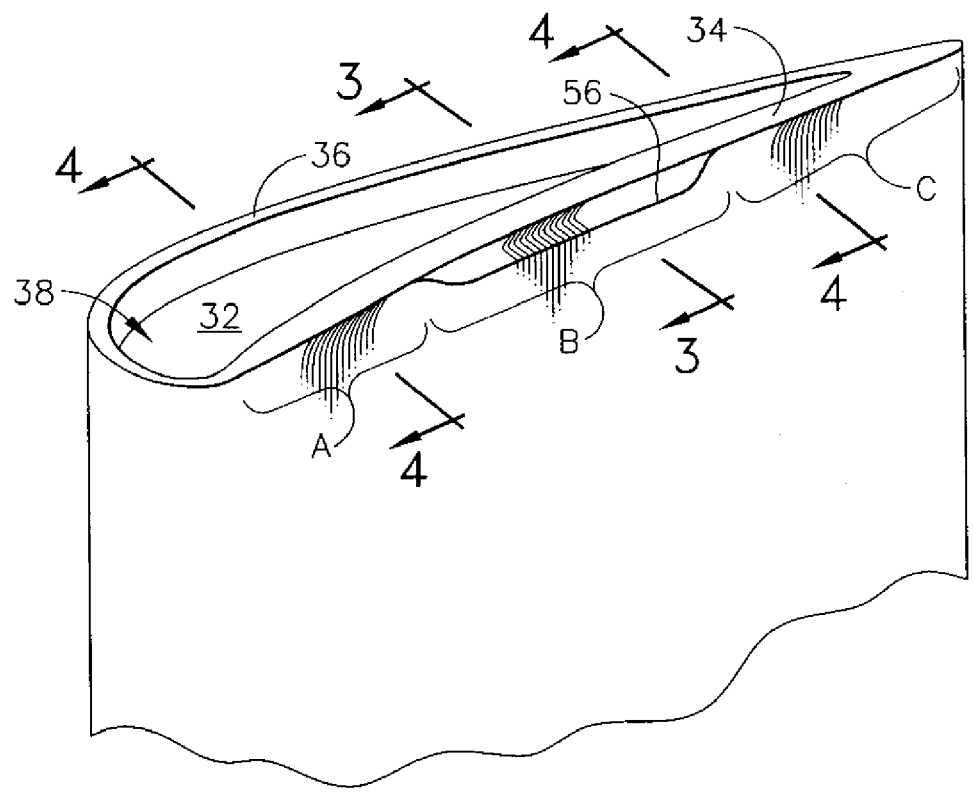
FIG. 2 is an enlarged view of a portion of the turbine blade of FIG. 1.

As shown more clearly in FIG. 2, the airfoil 18 includes a cast-in tip cap 32, and a so-called "squealer tip", which comprises spaced-apart pressure-side and suction-side tip walls 34 and 36, respectively, extending upwards from the tip cap 32 and surrounding the perimeter of the airfoil 18 to define an open tip cavity 38. The squealer tip may be integrally cast as part of the airfoil 18 or it may be made separately and attached thereto.

Figure 3:
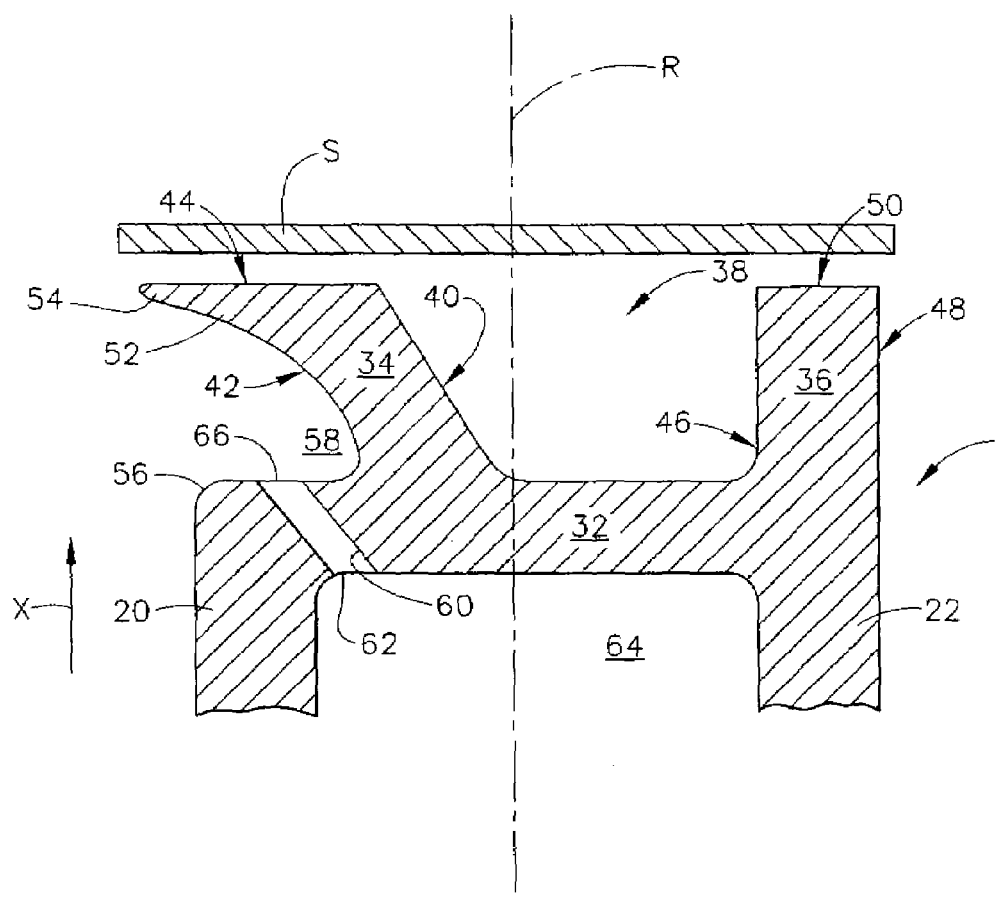
FIG. 3 is a cross-sectional view taken along lines 3-3 of FIG. 2.

Referring to FIG. 3, the pressure-side tip wall 34 has an inner surface 40 which faces the tip cavity 38, an outer surface 42 which faces the primary gas flow, and a radially-facing tip surface 44 extending between the inner and outer surfaces 40 and 42. The suction-side tip wall 36 also has an inner surface 46 which faces the tip cavity, an outer surface 48 which faces the gas flow, and a radially-facing tip surface 50 extending between the inner and outer surfaces 46 and 48.

Figure 5:
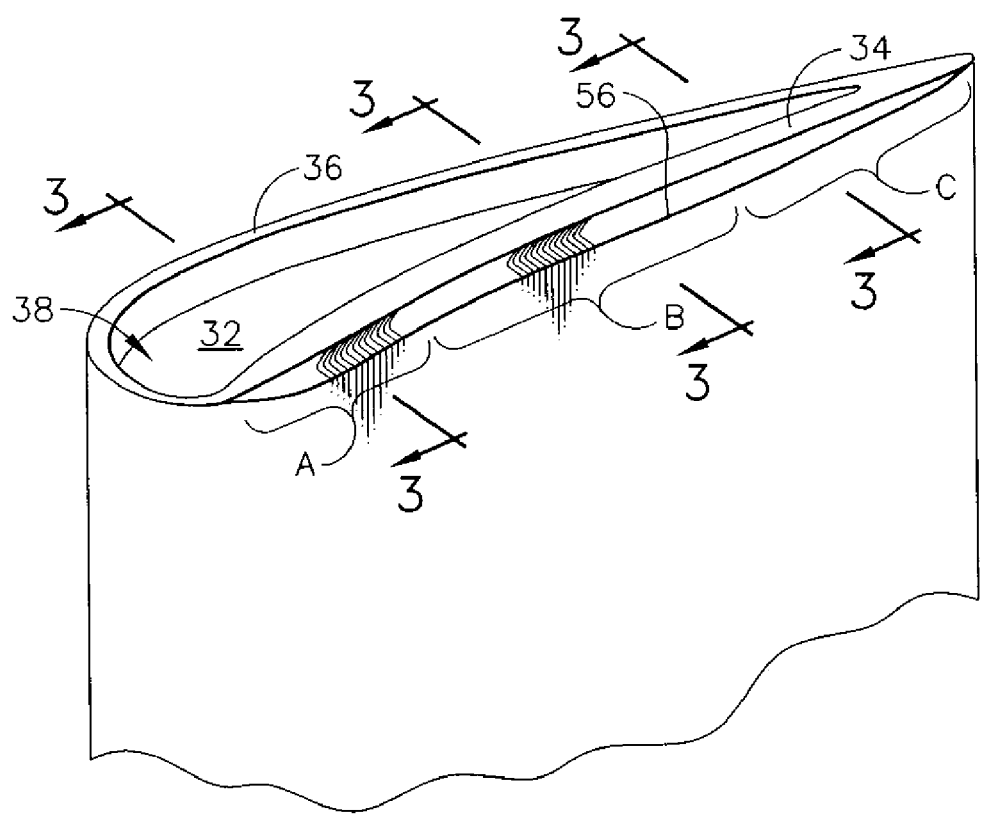
FIG. 5 is an another embodiment of the portion of turbine blade shown in FIG. 2.

In at least a mid-chord region of the airfoil 18, labeled "B" in FIG. 2, the pressure-side tip wall 34 is recessed or offset from the pressure sidewall 20 to define a radially outwardly facing tip shelf 56. In one embodiment, the tip shelf 56 extends substantially the entire axial length of the airfoil from the leading edge to the trailing edge as shown in FIG. 5. Together, the pressure-side tip wall 34 and the tip shelf define a trough 58. A plurality of first cooling holes 60 extend therethrough the tip shelf 56. Each of the first cooling holes 60 has an inlet 62 disposed in flow communication with an interior cavity 64 of the airfoil 18, which is connected to a source of cooling air, and an outlet 66 disposed in flow communication with the trough 58.

Figure 4:
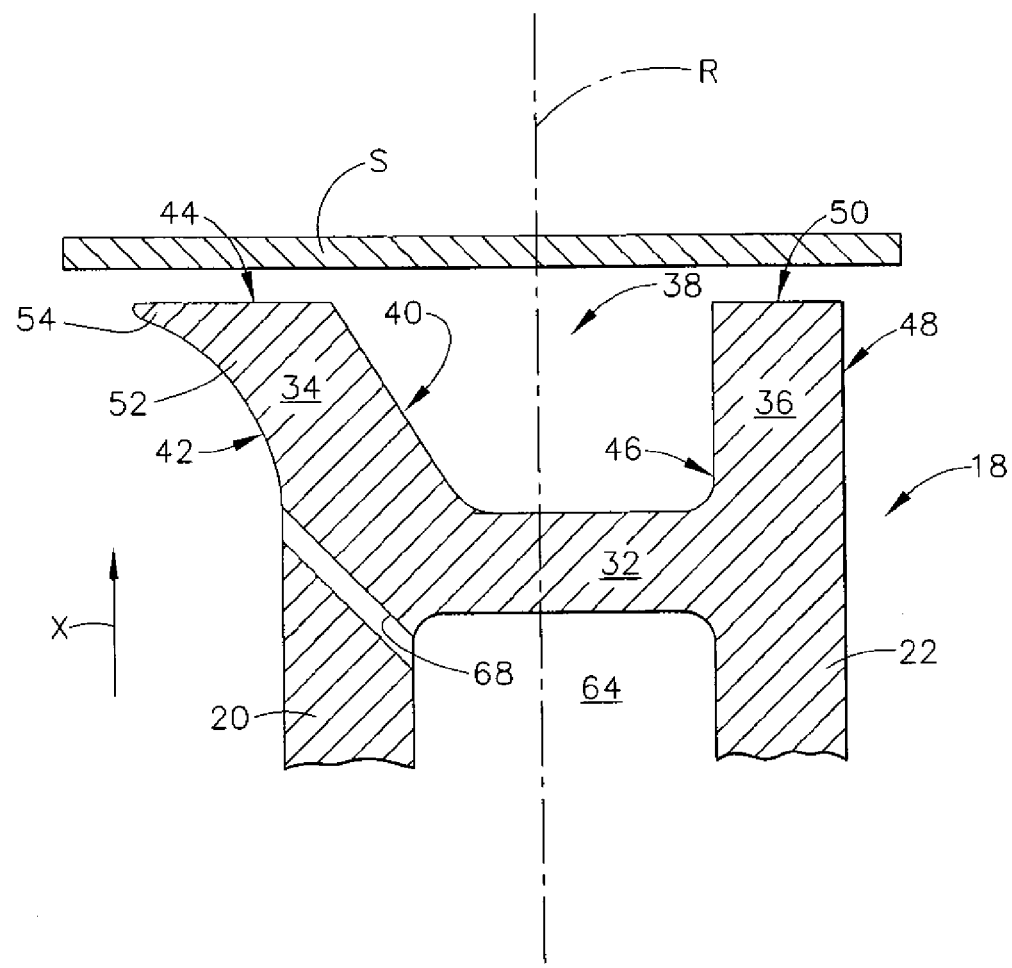
FIG. 4 is a cross-sectional view taken along lines 4-4 of FIG. 2.

The offset of the pressure-side tip wall 34 may be gradually decreased or "blended out" in forward and aft directions. The cross-sectional view shown in FIG. 4 is representative of both a leading edge region "A" disposed forward of the mid-chord region B, and a trailing edge region "C" disposed aft of the mid-chord region B. The tip shelf 56 is absent in each of these regions. A plurality of second cooling holes 68 extend the pressure sidewall 20 and communicate with the interior cavity 64.

Figure 6:
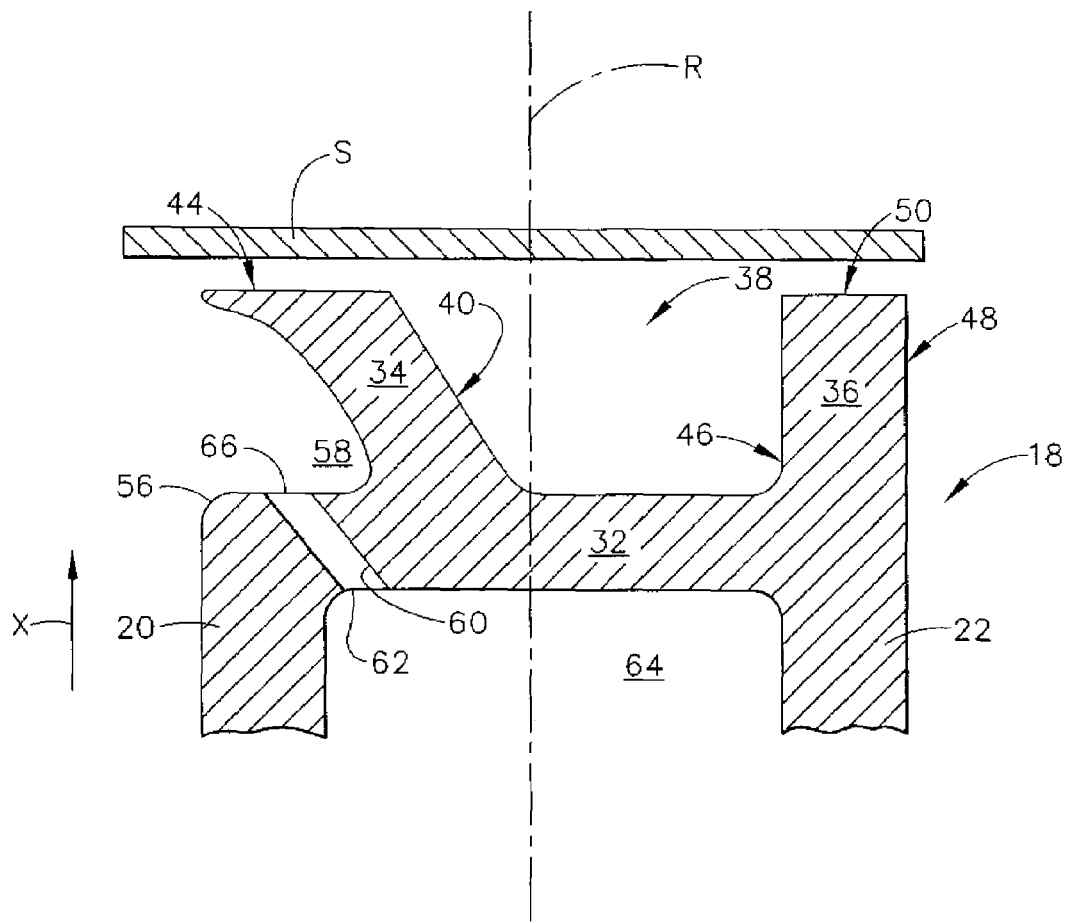
FIG. 6 is a cross-sectional view of another embodiment of the portion of turbine blade shown in FIG. 3.
Figure 7:
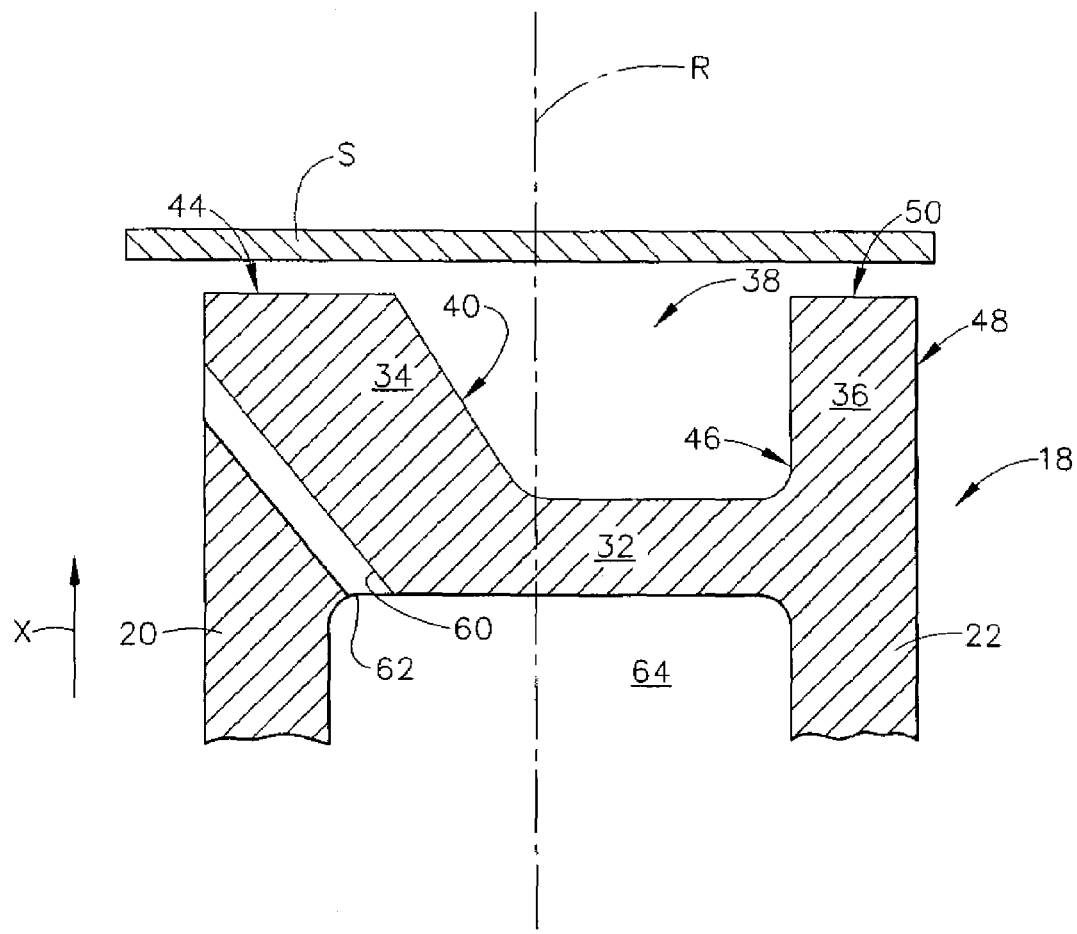
FIG. 7 is a cross-sectional view of another embodiment of the portion of turbine blade shown in FIG. 4.

As shown in both FIGS. 3 and 4, the outer surface 42 of the pressure-side tip wall 34 extends away from the radial axis "R" of the airfoil 18 in a circumferential direction, and defines a continuously concave curved arcuate portion 52. A tip corner 54 is defined at the junction of the arcuate portion 52 and the pressure-side tip surface 44. The position of the tip corner 54 in a circumferential direction may be varied to suit a particular application. In the illustrated example shown in FIG. 3, it is located outside of the plane of the pressure sidewall 20. In one embodiment the position of the tip corner 54 does not extend past an outer surface of the pressure sidewall as measured in a circumferential direction as shown in FIG. 6. The arcuate portion 52 may extend the entire axial length of the airfoil 18, or it may be blended out so that the pressure-side tip wall 34 assumes a conventional, parallel-sided shape at its forward and aft ends, as shown in FIGS. 1 and 7.

In operation, the airfoil 18 extracts energy from a primary combustion gas flow to cause a turbine rotor (not shown) to which it is mounted to rotate. It will also experience a secondary, radially-outward flow along the pressure sidewall 20, as shown by arrow "X" in FIGS. 3 and 4. Since the secondary flow has to make a turn of more than 90 degrees at the tip corner 54, it will create a flow separation bubble on the top of the tip surface 44 and effectively reduce the effective tip clearance between the airfoil 18 and the shroud "S", lowering the tip leakage flow. This effect is similar to prior art airfoils having inclined squealer tips. However, the curved wall approach allows for an increase in the local radial pumping which will increase the size of the aforementioned separation bubble as the flow turns the greater than 90 degree corner. The arcuate portion 52 will guide the secondary flow further away from the radial direction and require a sharper turning angle as compared to a straight-sided radial or inclined squealer tip wall. Therefore, the reduction of leakage flow will be more effective.

Furthermore, the film shelf in the mid-chord region B will shield the film cooling from mixing with the hot gas and achieve a better film effectiveness. More specifically, the tip shelf 56 provides a discontinuity in the airfoil pressure sidewall 20 to cause combustion gases to separate from the surface thereof as they flow over the pressure-side tip wall 34 which decreases the heat flux into the pressure-side tip wall 34. The tip shelf 56 also provides a region for cooling air discharging from the first cooling holes 60 to accumulate to provide a film cooling blanket between combustion gases and the pressure-side tip wall 34 further protecting the pressure-side tip wall from combustion gases and providing cooling thereof.

The foregoing has described an airfoil for a gas turbine engine having a curved squealer tip with a tip shelf. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine including a root, a tip, a leading edge, a trailing edge, and opposed pressure and suction sidewalls extending generally along a radial axis, and comprising:
   a tip cap extending between said pressure and suction sidewalls;
   spaced-apart suction-side and pressure-side tip walls extending radially outward from said tip cap to define a tip cavity therebetween;
   wherein said pressure-side tip wall includes a continuously concave curved arcuate portion, at least a section of which extends circumferentially outward from a radial axis of said airfoil, and said pressure-side tip wall is recessed from said pressure sidewall to define an outwardly facing tip shelf, such that said pressure-side tip wall and said tip shelf define a trough therebetween.

2. The airfoil of claim 1 further including a plurality of first cooling holes extending through said tip shelf, each of said first cooling holes having an inlet disposed in flow communication with a source of cooling air and an outlet disposed in flow communication with said trough.

3. The airfoil of claim 1 wherein said tip shelf extends for substantially the entire axial length of said airfoil from said leading edge to said trailing edge.

4. The airfoil of claim 1 wherein said airfoil includes, in series, a leading edge region, a mid-chord region, and a trailing edge region, and said tip shelf is substantially contained within said mid-chord region.

5. The airfoil of claim 4 wherein said arcuate portion extends for substantially the entire axial length of said airfoil from said leading edge to said trailing edge.

6. The airfoil of claim 4 wherein said arcuate portion extends for substantially less than the entire length of said airfoil from said leading edge to said trailing edge.

7. The airfoil of claim 1 wherein said pressure side tip wall includes spaced-apart inner and outer surfaces joined by a radially-facing tip surface; and
   a tip corner is defined at the junction of said outer surface and said tip surface.

8. The airfoil of claim 7 wherein said tip corner extends past an outer surface of said pressure sidewall as measured in a circumferential direction.

9. The airfoil of claim 7 wherein said tip corner does not extend past an outer surface of said pressure sidewall as measured in a circumferential direction.

10. The airfoil of claim 1 further comprising a plurality of second cooling holes disposed in said pressure sidewall and adapted to receive cooling air from a source and discharge it in a cooling film over said arcuate portion of said pressure side tip wall.

11. A turbine blade for a gas turbine engine, comprising:
a dovetail adapted to be received in a disk rotatable about a longitudinal axis;
a laterally-extending platform disposed radially outwardly from said dovetail; and
an airfoil including a root, a tip, a leading edge, a trailing edge, and opposed pressure and suction sidewalls extending generally along a radial axis, said airfoil comprising:
a tip cap extending between said pressure and suction sidewalls;
spaced-apart suction-side and pressure-side tip walls extending radially outward from said tip cap to define a tip cavity therebetween;
wherein said pressure-side tip wall includes a continuously concave curved arcuate portion, at least a section of which extends circumferentially outward from a radial axis of said blade, said pressure-side tip wall is recessed from said pressure sidewall to define an outwardly facing tip shelf, such that said pressure-side tip wall and said tip shelf define a trough therebetween.

12. The turbine blade of claim 11 further including a plurality of first cooling holes extending through said tip shelf, each of said first cooling holes having an inlet disposed in flow communication with a source of cooling air and an outlet disposed in flow communication with said trough.

13. The turbine blade of claim 11 wherein said tip shelf extends for substantially the entire axial length of said airfoil from said leading edge to said trailing edge.

14. The turbine blade of claim 11 wherein said airfoil includes, in series, a leading edge region, a mid-chord region, and a trailing edge region, and said tip shelf is substantially contained within said mid-chord region.

15. The turbine blade of claim 14 wherein said arcuate portion extends for substantially the entire axial length of said airfoil from said leading edge to said trailing edge.

16. The turbine blade of claim 14 wherein said arcuate portion extends for substantially less than the entire length of said airfoil from said leading edge to said trailing edge.

17. The turbine blade of claim 11 wherein said pressure side tip wall includes spaced-apart inner and outer surfaces joined by a radially-facing tip surface; and
a tip corner is defined at the junction of said outer surface and said tip surface.

18. The turbine blade of claim 17 wherein said tip corner extends past an outer surface of said pressure sidewall as measured in a circumferential direction.

19. The turbine blade of claim 17 wherein said tip corner does not extend past an outer surface of said pressure sidewall as measured in a circumferential direction.

20. The airfoil of claim 11 further comprising a plurality of second cooling holes disposed in said pressure sidewall and adapted to receive cooling air from a source and discharge it in a cooling film over said arcuate portion of said pressure side tip wall.

* * * * *